March 28, 1950      A. M. O'DEA      2,502,060
EMERGENCY WHEEL FOR VEHICLES

Filed March 20, 1947      2 Sheets-Sheet 1

Inventor
Augustine M. O'Dea

By *Clarence A. O'Brien and Harvey B. Jacobson*
Attorneys

March 28, 1950         A. M. O'DEA         2,502,060
EMERGENCY WHEEL FOR VEHICLES Filed March 20, 1947         2 Sheets-Sheet 2

Inventor
Augustine M. O'Dea

By Clarence A. O'Brien
and Harvey B. Jacobson
Attorneys

Patented Mar. 28, 1950

2,502,060

UNITED STATES PATENT OFFICE 2,502,060

EMERGENCY WHEEL FOR VEHICLES

Augustine M. O'Dea, Van Nuys, Calif.

Application March 20, 1947, Serial No. 735,888

1 Claim. (Cl. 301—38)

This invention relates to new and useful improvements in emergency tires for vehicles and the primary feature of the present invention is to provide an auxiliary tire which may be applied to an automobile and the like so that it may be driven to the nearest garage or station without injury to a tire which has become deflated and to which the emergency tire is applied.

Another important feature of this invention is to provide a device of the character referred to that is quickly and easily applied to the rear wheels of a vehicle as well as to the front wheels thereof.

A further feature of the present invention is to provide a device of the class described that includes complemental half discs which are of greater diameter than the wheel to which applied thereby securing a safe travel for a deflated tire in movement by the vehicle to a garage.

A still further feature of this invention is to provide an emergency tire for vehicles that is simple and practical in construction, easily applied to and removed from a deflated tire, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
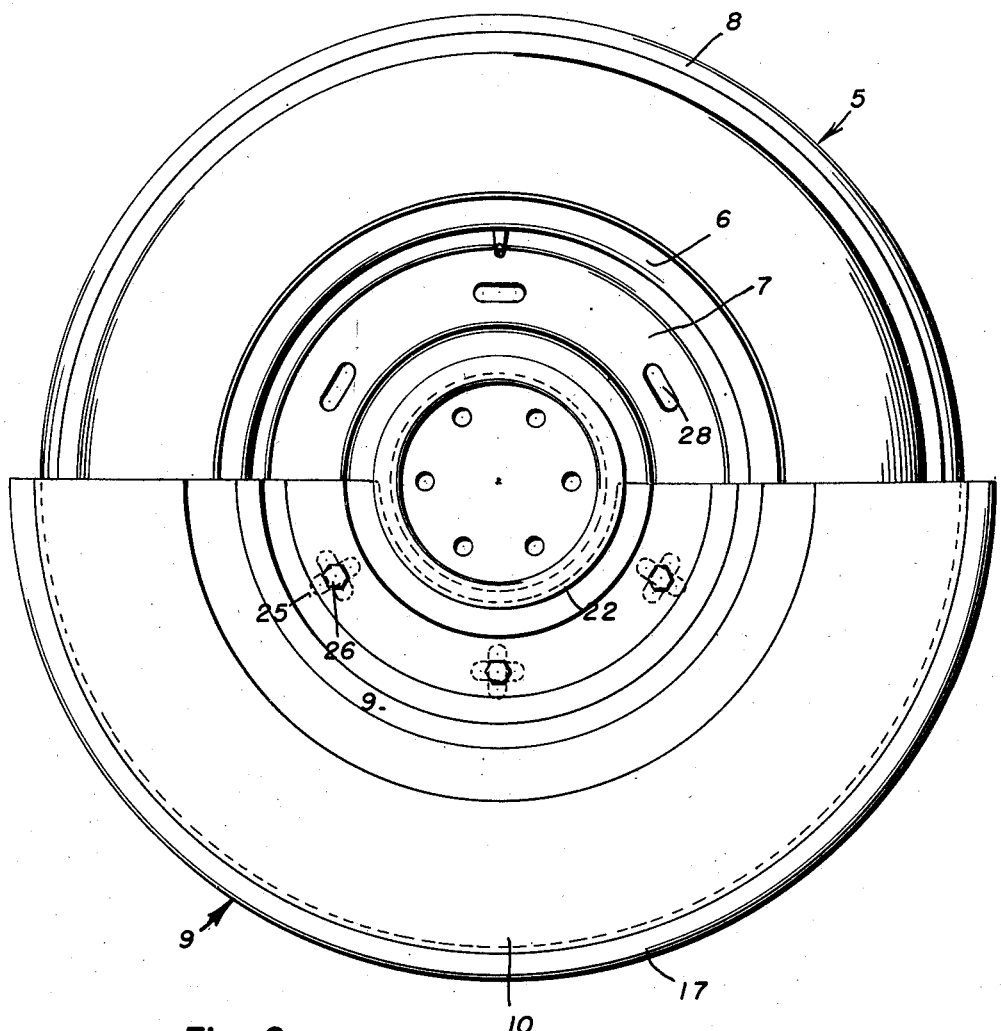
Figure 1 is a front elevational view of one of the complemental halves applied to a vehicle wheel.
Figure 2:
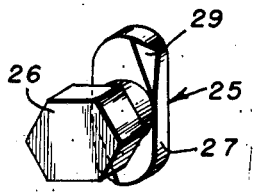
Figure 2 is an enlarged perspective view of the locking lugs or bolts for attaching the device to the vehicle wheel.
Figure 4:
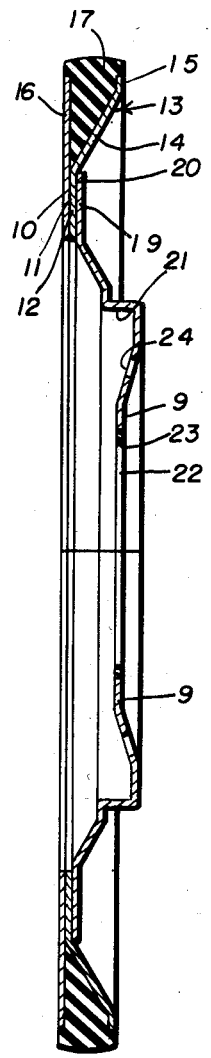
Figure 4 is a vertical sectional view of the emergency wheel removed from a vehicle wheel.

Referring now to the drawings in detail wherein for the purpose of illustration, I have disclosed a preferred embodiment of the present invention, the numeral 5 represents a usual vehicle wheel having a rim 6, a hub 7 and a pneumatic tire 8 carried in the usual way on said rim.

The emergency wheel for use with the vehicle wheel 5 comprises complemental halves 9, 9 each being made from steel metal and of half disc form, each having an outer half ring 10 whose inner portion is secured as at 11 to the flat portion 12 of an inner half ring 13 having an outwardly inclined portion 14. The outer edge of said inner half ring 13 is turned vertically as at 15 in alignment with the adjacent outer edge of half ring 10 to provide a peripheral wedge-shaped groove 16 at the outer edges of said complemental halves 9, 9 in which tread pieces 17 are suitably secured and extend outwardly from the edges of said complemental halves 9, 9.

The emergency wheel discs have their outer peripheries 19 secured as at 20 to the flat portion 12 of the inner half ring 13 and said discs have a shoulder 21 formed thereon which projects inwardly under the rim 6.

Figure 3:
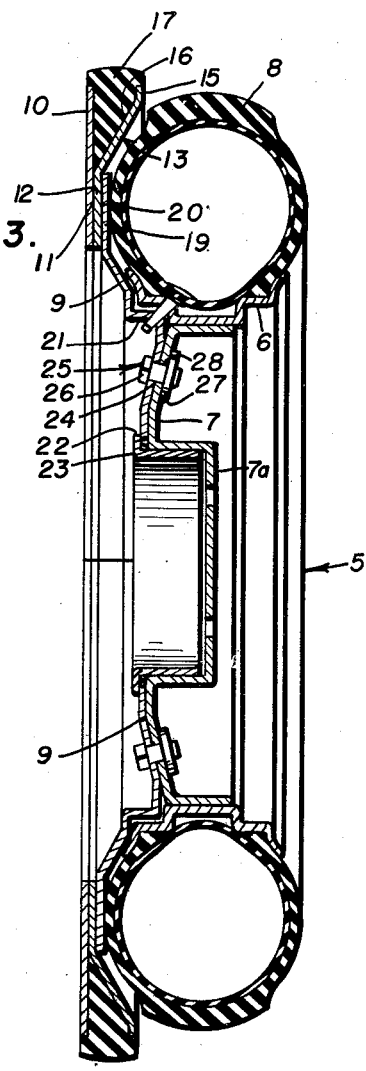
Figure 3 is a vertical sectional view of the wheel the device applied thereto.

A half circular opening 22 carrying a rubberized half ring 23 is adapted to receive the hub 7a of the vehicle wheel as shown in Figure 3 of the drawings, said rubberized half ring 23 adapted to prevent marring of said hub.

Extending through circular openings 24 provided in each half disc are locking bolts or lugs designated generally by the numeral 25, said bolts having nut heads 26 which extend on the outer side of the half disc and cross heads 27 which pass through slots 28 provided in the wheel 7.

The opposite corners of said cross heads are beveled as at 29 to provide easy camming means for turning cross heads 27 at right angles to slots 28 whereby nut heads may be tightened and drawing halves 9, 9 tightly in operative position against the pneumatic tired wheel of the vehicle.

Figure 5:
Figure 5 is a fragmentary sectional view of the emergency wheel in modified form.

Figure 5 of the drawings shows a modification of the emergency wheel wherein the inner half ring 30 is integrally formed with the half disc 31 which is secured to the hub of the vehicle wheel.

The inner surface of the emergency wheel may be coated with a suitable rubberized composition to prevent marring of the surface of the vehicle wheel.

In operation one of the half discs 9 is first secured to the upper portion of the wheel hub and the vehicle driven forward or rearwardly so that the vehicle wheel rotates a half revolution and the vehicle is supported on one of the halves 9. The other half 9 is then secured in place to complete the emergency wheel and which allows the vehicle to proceed to a garage for repairing the deflated tire of the vehicle.

It is believed that the details of construction and manner of use of the device will be readily understood from the foregoing without further detailed explanation.

It is to be understood, however, that even though there is herein shown and described a preferred embodiment of the invention the same is susceptible to certain changes fully comprehended by the spirit of the invention as herein described and the scope of the appended claim.

Having described my invention, what I claim as new is:

An auxiliary wheel for fastening to one side of a pneumatic tire disc wheel having a rim thereon, said auxiliary wheel comprising a center web formed with a right angled annular shoulder fitting in said rim, said auxiliary wheel being also formed with a flat annular radial portion offset outwardly of said shoulder integrally with said web and imposed against one side of the tire, said auxiliary wheel being further formed with an outwardly flaring portion connecting said radial portion to said shoulder and offsetting said radial portion outwardly, said web within said shoulder being dished to conformably fit the disc wheel, complemental annular felly-forming members of flat metal opposed side by side and fixed to said portion and extending beyond the tread of the tire, one of said members inclining inwardly over said side of the tire and the other member being parallel to said annular radial portion and forming with said inclining member a wedge-shaped felly groove, a correspondingly shaped tread member in said groove, said auxiliary wheel being diametrically divided into half sections, and means detachably securing said sections separately to said wheel inwardly of said shoulder.

AUGUSTINE M. O'DEA.

REFERENCES CITED

The following references are of record in the file of this patent:

UNITED STATES PATENTS

| Number | Name | Date |
| --- | --- | --- |
| 902,276 | Crone | Oct. 27, 1908 |
| 1,415,402 | Rossback | May 9, 1922 |
| 1,791,293 | Steinberg | Feb. 3, 1931 |
| 2,057,607 | Capehart | Oct. 13, 1936 |
| 2,130,448 | Signori | Sept. 20, 1938 |
| 2,282,222 | Goeske | May 5, 1942 |
| 2,372,049 | Bailey | Mar. 20, 1945 |